Feb. 6, 1962    G. P. FELTS    3,019,547
FISHHOOK EXTRACTOR
Filed July 18, 1960

Gordon P. Felts,
INVENTOR.

BY
Robert M. McManigal
Attorney 3,019,547
FISHHOOK EXTRACTOR
Gordon P. Felts, 122 Caravan Sahara Park, Palm Springs,
Calif., assignor of one-third to Arthur W. Jarrett, Palm
Springs, Calif., and one-third to Robert W. Seeger,
Arcadia, Calif.
Filed July 18, 1960, Ser. No. 43,411
5 Claims. (Cl. 43—53.5)

The present invention relates generally to a hand tool or device, and is more particularly concerned with a fishhook extractor for dislodging a fishhook from a fish.

Many and varied types of tools, implements, and instrumentalities have been devised for mechanically aiding the fisherman to disgorge or dislodge a fishhook from the fish. These devices have ranged from every simple contrivances to rather complex arrangements. In general, conventional devices of this character are inherently so constructed that they are most effective in those cases where the hook can be seen or is lodged in the mouth of the fish or in close proximity thereto. Such devices have not in general been adapted for those situations where the hook has been swallowed or is in a position where it can not be seen readily.

Having the foregoing inherent disadvantages of the conventional devices in mind, the present invention has for one object the provision of a fishhook extractor which is of simple construction, which is easy to use, and which will work effectively irrespective of whether the hook is visible or in a concealed location such as in the stomach of the fish.

A further object of the invention is to incorporate in such a device visible means for indicating or appraising the user of the position of the hook engaging means, when such means are invisible or cannot be readily seen.

Another object is to provide a device of this character which is devoid of moving parts. Still another object resides in the provision of a fishhook extractor which may also serve the added purpose of an instrumentality which may be utilized for stunning the fish.

Further objects of the invention will be brought out in the following part of the specification, wherein detailed description is for the purpose of fully disclosing the invention without placing limitations thereon.

Referring to the accompanying drawings, which are for illustrative purposes only:

Figure 1:
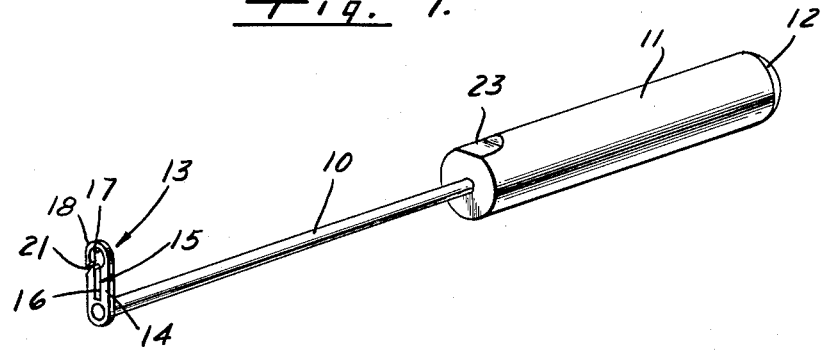
FIG. 1 is a perspective view of a fish extractor embodying the features of the herein described invention.
Figure 2:
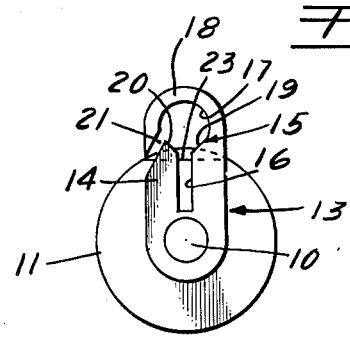
FIG. 2 is an end elevational view of the fishhook engaging means.

Referring generally to the drawings, the fishhook extractor of the herein described invention comprises an elongate shank 10 of elongate cylindrical form, and of a stiff strong material. While various materials may be utilized, a non-corrosive metallic material is very suitable.

One end of the shank 10 connects with an enlarged cylindrical handle 11 having a rounded outermost end 12. This handle is preferably made of solid metal so as to provide a handle of rather heavy weight which may be utilized as an instrumentality for stunning a fish.

The other end of the shank 10 carries a head member, as generally indicated by the numeral 13, which constitutes means for engaging the fishhook which is to be dislodged or disgorged.

More specifically, the head member is in the form of a flat elongate plate 14, and is shown as having parallel lateral edges and its opposite ends rounded. The plate member 14 is connected at one end to the shank 10 in such manner that the plate will project substantially at right angles to the shank axis and will have its plain surfaces normal to the shank.

The plate 14 is fabricated with a key hole slot therein, as generally indicated at 15, and consisting of an axially extending narrow slot portion 16 which is positioned adjacent the shank 10 and extends outwardly and communicates with an enlarged head portion 17 defined by an arcuate edge 18 which is connected at its ends by converging straight edge portions 19 and 20 with the adjacent end of the slot portion 16.

At the juncture of one end of the arcuate edge 18 and the edge portion 20, there is provided a slot-like passage 21, the inner end of which connects with the head opening portion 17 and at its outermost end opens into the adjacent side edge of the plate member. The passage 21 is rearwardly inclined from its inner end to its outer end in a direction towards the shank 10, and this passage provides means through which the fishing line or shank of a fishhook may be passed from the exterior of the plate 14 into the head portion 17 of the key hole slot for a purpose to be subsequently explained in detail.

The device of the present invention provides a fishhook extractor which works equally efficiently regardless as to whether the fishhook is visible as when in the fish's mouth, or invisible as when the hook may be partially swallowed or even in the fish's stomach.

Figure 3:
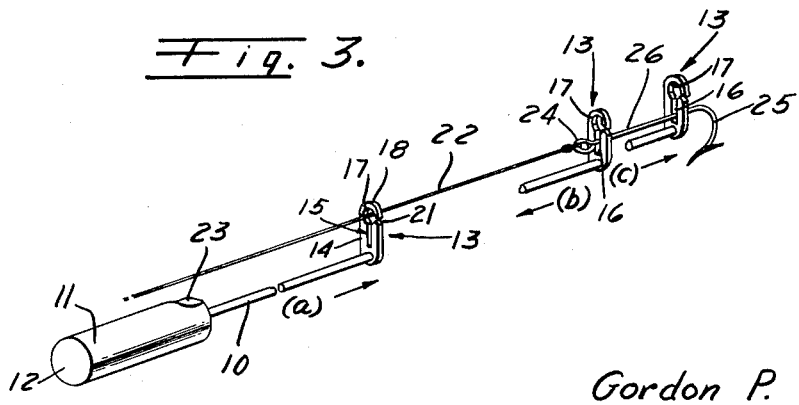
FIG. 3 is a view diagrammatically illustrating the use and operation of the fishhook extractor.

In the case where the fishhook is not readily visible, the fish line, as indicated by the numeral 22, is utilized as an instrumentality for guiding the device to the hook. For such purpose, the fish line is laterally passed through the passage 21 into the head portion 17, as shown in FIG. 3(a). It will be observed that in this position, the shank 10 is below the fish line so that by pushing on the handle 11, the head member 13 may be pushed along the fish line, the device riding therealong on the curved arcuate edge 18. Thus the head member 13 may be easily moved to the hook. Should the head member 13 become concealed by virtue of being moved into the fish's throat or stomach, the position of the plate 13 with respect to its angular circumferential direction of projection from the shank 10 may be readily determined by means of a flat surface 23 formed on the handle 11 on the side of the shank 10 corresponding to the direction in which the plate 14 projects from the shank. It is therefore possible to know at all times the direction in which the head member 13 projects from the shank.

As the position FIG. 3(b) is approached, the eye 24 of the fishhook 25 will pass through the head portion 17 of the key hole opening so that the head member will now be disposed upon the shank portion 26 of the fishhook. At this position, by simple tilting operation it is possible to raise the plate 13 so that the shank 26 of the hook may be positioned within the slot portion 16, this slot being of such width that the eye 24 of the hook will not pass through it. By a pulling movement on the handle 11, the fishhook may be torn loose and thus removed. It may also be removed by a pushing operation as shown in FIG. 3(c) which moves the plate 13 to the hooked end of the fishhook where by a pushing force the barbed end may be dislodged and the hook thus removed.

In the case of rather large hooks having a shank portion which will not pass through the passage 21, a visible hook may be readily removed simply by inserting the plate 13 over the hook eye 24 so that the eye passes through the head portion 17 of the key hole slot, the fish line being thus looped through the opening 17. By moving the plate 13 so that the shank and line are moved into the slot portion 16, the hook may then be removed as described above.

From the above, it will be apparent that the fishhook extractor of the present invention may be utilized with a variety of hook sizes without in any way limiting its effectiveness.

Various modifications may suggest themselves to those skilled in the art without departing from the spirit of my invention, and, hence, I do not wish to be restricted to the specific form shown or uses mentioned, except to the extent indicated in the appended claims.

I claim:

1. A fishhook extractor for removing a fishhook having an eye, comprising: an elongate shank member; a handle at one end of said shank; and hook engaging means at the other end of said shank including a member extending at substantially right angles to the shank axis, said member having a generally key-shaped opening therein comprised of an elongate slot portion positioned adjacent the shank, and an enlarged head portion positioned in spaced relation to the shank, the slot portion being of a width less than the diameter of the fishhook eye, and a communicating passage with said opening, whereby a fishing line may be laterally passed from the exterior of said member into said opening.

2. A fishhook extractor for removing a fishhook having an eye, comprising: an elongate shank member; an elongate handle providing a hand grip at one end of said shank; hook engaging means at the other end of said shank including a member extending at right angles to the shank axis, said member having a key-shaped opening therein comprised of an elongate slot portion positioned adjacent the shank, and an enlarged head portion positioned in spaced relation to said shank, the slot portion being of a width less than the diameter of the fishhook eye, and a communicating passage with said opening for passing a fishing line laterally from the exterior of said member into said opening; and indicating means carried by said handle showing the circumferential angular position of projection of said member with respect to said shank axis.

3. A fishhook extractor, comprising: an elongate shank member; an elongate handle grip member at one end of said shank; and hook engaging means at the other end of said shank including a flat surfaced plate member extending at substantially right angles to the shank axis and having the plane of said flat surface extending transversely to the shank axis, said member having an opening therein comprised of an elongate slot portion and a connected enlarged head portion, and a communicating passage extending from said head portion and opening into an edge of the plate, whereby a fishing line may be laterally passed from the exterior of said member into said opening.

4. A fishhook extractor, comprising: an elongate shank part; a handle at one end of said part; a head member at the other end of said part secured at one end to said part and projecting laterally at substantially right angles therefrom, said member having a key hole shaped opening therein consisting of a narrow slot portion adjacent said part, and an enlarged connecting portion outwardly spaced from said part, and an entrance passage connecting the exterior of said member and said enlarged portion, said passage being inclined from its inner end to its outer end in a direction towards said part.

5. A fishhook extractor, comprising: an elongate shank part; a handle at one end of said part; a transverse flat elongate plate member at the other end of said part secured at one end to said part and projecting outwardly at substantially right angles therefrom, said member having a key hole shaped opening therein consisting of a narrow slot portion adjacent said part of a size to receive a shank of a fishhook therethrough, and an enlarged communicating portion outwardly spaced from said part of a size to pass the eye of a hook therethrough; and an entrance passage connecting the exterior of said part and said enlarged portion, said passage being inclined from its inner end to its outer end in a direction towards said part, whereby the fishing line and hook shank may be selectively passed laterally into the enlarged portion of said opening.

References Cited in the file of this patent
UNITED STATES PATENTS

| | | |
|---|---|---|
| 1,043,627 | Risdon | Nov. 5, 1912 |
| 2,348,662 | Stevens | May 9, 1944 |
| 2,492,799 | Holland | Dec. 27, 1949 |